United States Patent
Abbott

[15] 3,650,353
[45] Mar. 21, 1972

[54] LUBRICATION SYSTEM FOR CHANGE-SPEED EPICYCLIC GEARING

[72] Inventor: Randle Leslie Abbott, 96 Radford Road, Leamington Spa, England

[22] Filed: Feb. 2, 1970

[21] Appl. No.: 7,839

[30] Foreign Application Priority Data

Feb. 19, 1969 Great Britain..........................8,880/69

[52] U.S. Cl.............................................184/6.12, 74/801
[51] Int. Cl...........................................................F16n 7/20
[58] Field of Search.....................184/6, 6 C, 6 U, 11, 11 A, 184/13; 74/801

[56] References Cited

UNITED STATES PATENTS

| | | | |
|---|---|---|---|
| 2,326,751 | 8/1943 | Buckendale | 184/6 U X |
| 2,403,579 | 7/1946 | Carpenter | 184/6 U |
| 2,466,320 | 4/1949 | Lawrence | 184/6 U X |
| 2,516,200 | 7/1950 | Geyer | 184/6 U X |
| 3,438,462 | 4/1969 | Nelson | 74/801 X |
| 3,448,828 | 6/1969 | Goldberg | 184/6 |

FOREIGN PATENTS OR APPLICATIONS

| | | | |
|---|---|---|---|
| 1,047,820 | 12/1958 | Germany | 184/6 U |

*Primary Examiner*—Manuel A. Antonakas
*Attorney*—Holman & Stern

[57] ABSTRACT

A change-speed epicyclic gearing in which lubricant is directed along two different paths according to the operative condition of the gearing. In direct drive ratio the lubricant passes along one path to a thrust bearing between the sun gear and the casing and in the epicyclic ratio the lubricant passes along another path to the planet gear bearings. In this way those parts of the gearing which require lubricant only receive it when needed.

3 Claims, 3 Drawing Figures

FIG. I.

INVENTOR
RANDLE LESLIE ABBOTT
BY Holman, Glassock,
Downing & Seebold
ATTORNEYS

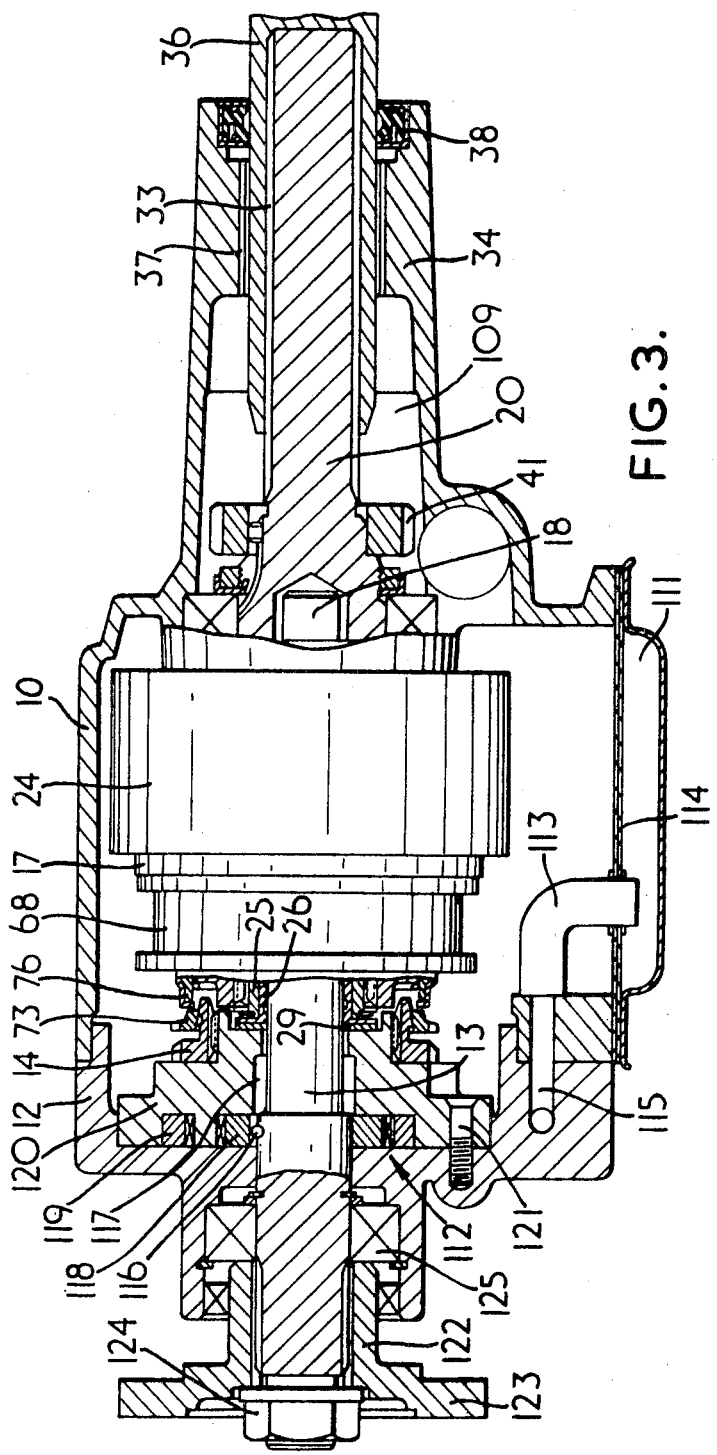

LUBRICATION SYSTEM FOR CHANGE-SPEED EPICYCLIC GEARING

This invention relates to a lubrication system for change-speed epicyclic gearing.

Change-speed epicyclic gearing has been proposed, for example in U.S. Pat. No. 3,426,623, in which the gearing has been lubricated by lubricant passed around the gearing from a scoop which collects lubricant during relative rotation between the gearing and the gear casing.

An object of the invention is to provide an improved lubrication system for change-speed epicyclic gearing.

A further object of the invention is to provide a lubrication system for change-speed epicyclic gearing in which circulation of the lubricant is induced through relative rotation between parts of the gearing.

According to the invention there is provided an epicyclic change-speed gearing for transmitting drive optionally at an epicyclic ratio or a direct drive ratio, comprising a casing, input and output shafts supported by said casing, a sun gear having a bore through which one of said shaft extends coaxially with the bore, thrust bearing means disposed between the sun gear and the casing to take the thrust load of the sun gear on the casing, a planet carrier drivingly connected to one of the shafts, planet gear means meshing with the sun gear and rotatably mounted on the carrier by planet gear bearing means, an annulus gear meshing with said planet gear means and drivingly connected to the other of the shafts, selecting means for optionally clutching the sun gear to the casing to hold the sun gear stationary to provide said epicyclic ratio in which relative rotation between the shaft passing through the sun gear and the sun gear takes place or clutching the sun gear to rotate at the same speed as the planet carrier and annulus gear to provide said direct drive ratio in which relative rotation between the sun gear and the casing takes place, a lubricant reservoir in the casing, a chamber which surrounds the shaft passing through the sun gear and is in communication with the reservoir, means for feeding lubricant from said reservoir to said chamber, first lubricant feed means in communication with the chamber and associated with the thrust bearing means and operative on relative rotation of the sun gear and the casing to feed lubricant from said chamber into and through the thrust bearing means, and second lubricant feed means within said bore of the sun gear and in communication with the chamber and operative on relative rotation between the sun gear and the shaft passing through the sun gear to feed lubricant to said planet gear bearing means.

Further features of the invention appear from the following description of two embodiments of the invention given by way of example only and with reference to the accompanying drawings in which:

FIG. 3 is a sectional elevation of a second embodiment of the invention.

Figure 1:
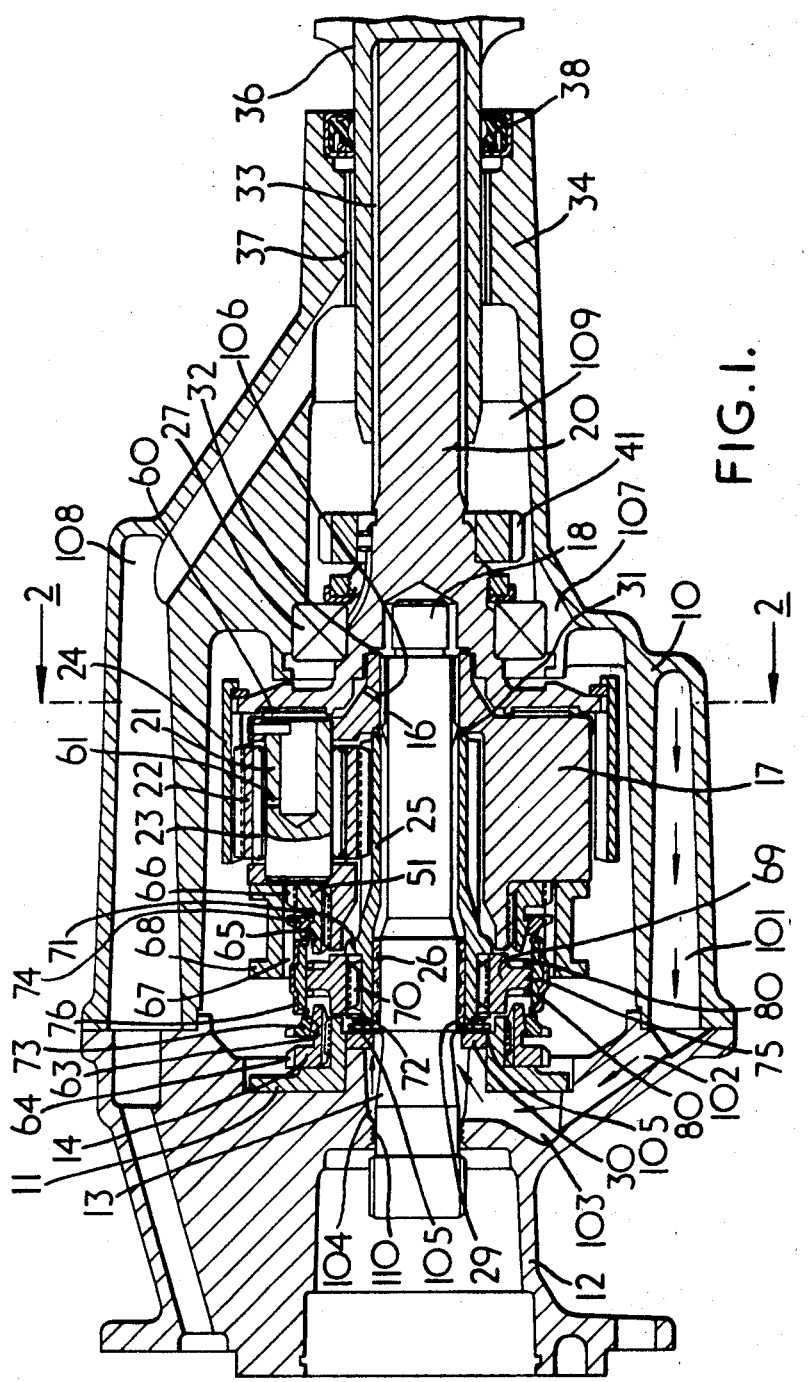
FIG. 1 is a longitudinally sectioned view on the line 1—1 in FIG. 2 of auxiliary change-speed epicyclic gearing.
Figure 2:
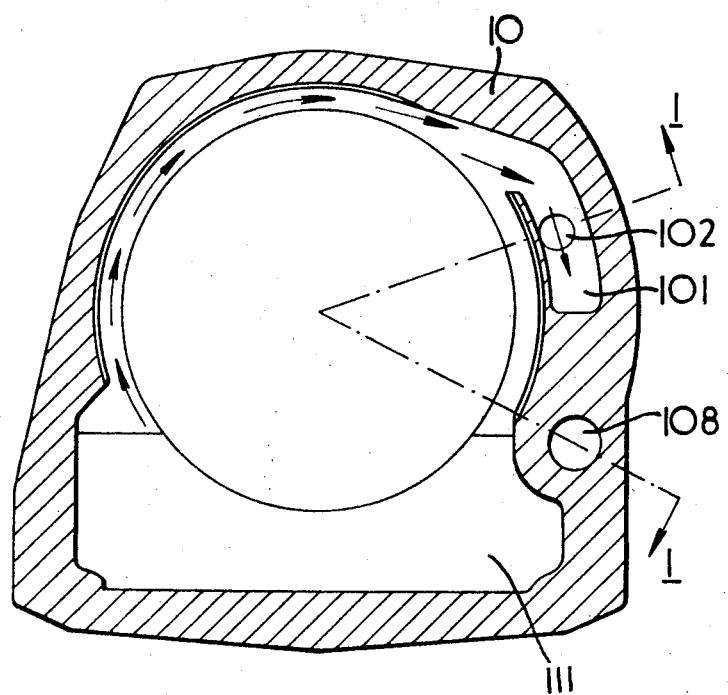
FIG. 2 is a sectional elevation on the line 2—2 in FIG. 1.

Referring to FIGS. 1 and 2 of the drawings, the auxiliary change-speed epicyclic gearing, which is suitable for use in a road vehicle, is arranged in a casing 10 secured to an adaptor casing 12 housing part of the main change-speed gearing (not shown). A shaft 13 is adapted to be secured to the power output shaft of the main change-speed gearing and constitutes the power input shaft of the auxiliary change-speed gearing.

The end of the shaft 13 remote from the main gearing is formed with splines 16 drivingly engaged with corresponding splines of a planet carrier 17. The end of the shaft 13 is also provided with a coaxial nose 18 supported by a bush (not shown) in a power output shaft 20 of the auxiliary change-speed gearing.

The planet carrier 17 supports three equi-angularly spaced hollow pins 21, only one of which is shown, and each pin 21 supports a helically toothed planet gear wheel 22 through a needle roller bearing 23. The three planet gear wheels 22 mesh with an annulus gear wheel 24 formed integral with the power output shaft 20, and also with a sun gear wheel 25 mounted co-axially about the power input shaft 13 through a bush 26 which allows relative rotation. The annulus gear wheel 24 and the power input shaft 20 are supported from the casing 10 by a combined thrust and journal bearing 27 which is restrained from axial movement. The sun gear wheel 25 is prevented from moving axially by means of an annular thrust washer 29 bearing against an annular member 30 which abuts against the casing 12. Two annular thrust washers 31 and 32 are arranged respectively one between the sun gear wheel 25 and the planet carrier 17 and the other between the planet carrier 17 and the power output shaft 20.

The power output shaft 20 has its end remote from the annulus gear wheel 24 formed with splines 33 and extending through an extension casing 34 which is integral with the casing 10. An internally splined propellor shaft 36 is drivingly engaged with the splines 33 and is rotatively and slidingly supported by a bush 37. A seal 38 prevents loss of lubricant from the casing 34 and a passage (not shown) between the bush 37 and the casing 34 prevents accumulation of lubricant between the bush 37 and the seal 38. A gear wheel 41 meshes with a worm drive (not shown) for a flexible speedometer drive and is drivingly secured to the output shaft 20.

The sun gear wheel 25 constitutes the reaction member of the gearing and provision is made for optionally locking the sun gear wheel 25 to the non-rotary casing so that the power output shaft 20 will be driven at the epicyclic ratio faster than the power input shaft 13, or locking the sun gear wheel 25 to a rotary element of the bearing to inhibit the epicyclic action of the gearing so that the power output shaft 20 will be driven at the same speed as the power input shaft 13, i.e., at a direct drive ratio.

An end plate 11 is secured to the casing 12 and a gear member 14 engages with splines on the end plate 11 and is thereby held against rotation. The member 14 has a coaxial extension defining a frusto-conical brake surface 63 and a peripheral series of dog teeth 64 constituting a toothed coupling member. The planet carrier 17 carries a gear member 51 through a splined connection and the member 51 is also formed with a coaxial extension defining a frusto-conical clutch surface 65 and a peripheral series of dog teeth 66 constituting another toothed coupling member. The toothed coupling members 64 and 66 have the same number of teeth and are alternatively engageable by the splines 67 of an axially slidable collar 68. The splines 67 are slidably engaged with corresponding splines in the periphery of a synchronizer hub 69 and the collar 68 constitutes an axially movable toothed coupling member. The synchronizer hub 69 is held for rotation with the sun gear wheel 25 by splines 70 and is axially located by an annular flange 71 integral with the sun gear wheel 25 and by a spring clip 72. A pair of synchronizer rings 73 and 74 having the same number of teeth as the axially movable toothed coupling member 68, coact respectively with the frusto-conical surfaces 63 and 65. The synchronizer hub 69 is formed in its periphery with three equally spaced longitudinally directed slots 75 in each of which is slidingly arranged a synchronizer plate 76 in the form of a scroll pressing having a central hump. Each synchronizer plate 76 has its end permanently engaged in slots (not shown) formed in the synchronizer rings 73 and 74 so that the latter are at all times driven by the synchronizer hub 69 through the three synchronizer plates 76. A pair of light expander rings 80 are carried by the synchronizer hub 69 and serve to urge each synchronizer plate 76 radially outwards.

The axially movable toothed coupling member 68 is shown in the drawing locking the sun gear wheel 25 to the toothed coupling member 66 carried by the planet carrier 17, so that the power input shaft 13 will drive the power output shaft 20 at the same speed to provide the direct drive ratio. To provide the epicyclic overdrive ratio, the axially movable toothed coupling member 68 is first moved leftwards to disengage from the toothed coupling member 66 and the synchronizer ring 74. The member 68 then assumes a neutral position and further movement leftwards moves the synchronizer plates 76 with the member 68 until the plates 76 abut the synchronizing ring 73 and push the ring 73 against the brake surface 63 to bring the sun gear wheel 25 to rest. The coupling member 68 engages the peripheral teeth of the synchronizer ring 73 and the toothed coupling member 64, thereby locking the sun gear wheel 25 to the non-rotary end plate 11 so that the power input shaft 13 will drive the power output shaft 20 at the planetary overdrive ratio.

The axially movable toothed coupling member 68 may be moved in the opposite direction in a similar manner to engage the toothed coupling member 66. Movement of the coupling member 68 is effected by control means (not shown) in known manner.

A lubricant reservoir 101 is formed in the side wall of the casing 10 and the reservoir 101 communicates with the interior of the casing 10 over the upper part of the casing. The lubricant level in the sump 111 within the casing 10 ensures that the gearing within the casing dips in the lubricant and throws lubricant around the internal periphery of the casing. Some of this lubricant is caught in the reservoir 101 and is carried forward to a duct 102 formed in the casing 12. The lubricant passes from the duct 102 into a radial bore 103 in the casing 12 and thence into an annular channel 104 formed in the casing around the shaft 13 and terminating adjacent the thrust washer 29.

When the gearing is in the direct drive ratio, as shown in the drawing, lubricant passes from the channel 104 radially through slots 105, which may be arranged tangential to or spirally of the shaft 13, formed in the thrust washer 29. The rotation of the washer 29 with the sun gear wheel 25 causes the lubricant to be carried through the slots 105 under the action of centrifugal force. Since the gearing is rotating together as a unit it requires no lubrication.

When the gearing is in the planetary or epicyclic ratio, i.e., when the sun gear wheel 25 is locked to the casing and the wheel 25 constitutes the reaction member so that the gearing is in overdrive, the lubricant takes a different path through the gearing. The thrust washer 29 is stationary so lubricant is not induced to flow through the slots 105.

The bush 26 is formed with an internal spiral channel which carries lubricant from the channel 104 towards the output shaft 20 in the annular space between the input shaft 13 and the sun gear wheel 25. The action of the spiral channel in the bush 26 is only effective when relative rotation occurs between the input shaft 13 and sun gear wheel 25 since the bush 26 is always stationary in planetary ratio.

One tooth is omitted from the splines 16 on the input shaft 13 and the lubricant passes along the resulting gap in the splines 16 to a radial bore 106 in the planet carrier 17 and is thrown radially outwards along the bore 106, and then into the space between the planet carrier 17 and the annulus gear wheel 24 and into the path of an annular plate 60. The plate 60 deflects the lubricant into the interior of the three hollow pins 21, and then from the pins 21 through a radial port 61 to lubricate the needle roller bearings 23 supporting the planet gear wheels 22. The rest of the gearing is splash lubricated.

A scoop 107 in the casing 10 transfers lubricant to the speedometer gear wheel.

A threaded portion 110 formed on the casing 12 around the shaft 13 is of such a hand as to prevent loss of lubricant from the channel 104 during rotation of the shaft 13.

The reservoir 101 is arranged at such an angle that even when the vehicle is climbing a 1 in 5 gradient an adequate head of lubricant is maintained in the reservoir to feed the lubrication system.

A duct (not shown) from the reservoir 101 to provide lubricant for the bush 37 is located at about 45° below the horizontal center line to form a reservoir for lubricant for the bush 37 even when the vehicle is descending long gradients.

In order to provide for lubricant being passed from the main gearing to within the casing 34 in situations where the casing 34 is above the normal oil level in the casing 10, a level balancing channel 108 extends from the main gearing, through the main gearing casing; through the auxiliary gearing casing 10, and through the casing 34 into the space 109 surrounding the output shaft 20. The latter arrangement allows for lubricant to be delivered into the main gearing casing and to pass direct to the output end of the auxiliary gearing casing and thereby obviates any delay in ascertaining the true level of lubricant in the gearing.

In an alternative construction, shown in FIG. 3, the same reference numerals are applied to similar parts as in the embodiment described with reference to FIGS. 1 and 2. In this construction the reservoir 101 is omitted, all the lubricant passing to a sump 111 when thrown off the gearing, the sump then acting as the reservoir for lubricant for the gearing. The lubricant still passes through the gearing in one of two paths in the same manner as described in relation to FIGS. 1 and 2 but in the present case the lubricant paths communicate with the sump 111 through a pump 112. The pump 112 draws lubricant from the sump 111 through a pipe 113 having its inlet end located below a filter gauze 114. The lubricant passes through the pipe 113, a bore 115 formed in the gearing casing, and through a bore (not shown) to the pump inlet (not shown). The lubricant passes from the pump through a pump outlet (not shown), through a bore (not shown) to an annular space 117 about the shaft 13 and adjacent the thrust washer 29. Thereafter the lubricant passes along one of the two paths in the gearing as previously described.

The pump 112 is of the known crescent gear pump kind and includes a rotor 118 keyed to the shaft 13 by a key 116 and an annulus gear 119 located about the rotor 118 and a portion of a stationary member 120 which supports the gear member 14 and which is secured to the gear casing 10 by screws 121.

The main flow of lubricant from the pump 112 may be utilized to power the changeover of the gearing from direct drive ratio to epicyclic ratio and vice versa. In such an arrangement lubricant for the gearing may pass from the pump through a relief valve.

The construction of FIG. 3 enables the overall dimensions of the gearing casing to be reduced and in this arrangement the level balancing channel 108 of FIGS. 1 and 2 can be omitted to further reduce the dimensions of the casing since the gearing is now a self-contained unit so far as lubricant is concerned. The input shaft 13 is connected to a drive shaft (not shown) through an internally splined sleeve 122, formed with a radial flange 123, which fits onto the splined end of the input shaft 13. The sleeve 122 is fixed in place by a nut 124 which engages a screw thread on the shaft 13, and a combined thrust and journal bearing 125 bears against the end of the sleeve 122.

The lubrication system described above ensures that lubricant in the auxiliary gearing is taken to the parts which need lubricant, whenever they need it, both when the gearing is in direct drive ratio and in planetary ratio.

What I claim as my invention and desire to secure by Letters Patent of the United States is:

1. An epicyclic change speed gearing for transmitting drive optionally at an epicyclic ratio or a direct drive ratio, comprising a casing, input and output shafts supported by said casing, a sun gear having a bore through which one of said shafts extends coaxially with the bore, thrust bearing means disposed between the sun gear and the casing to take the thrust load of the sun gear on the casing, a planet carrier drivingly connected to one of the shafts, planet gear means meshing with the sun gear and rotatably mounted on the carrier by planet gear bearing means, an annulus gear meshing with said planet gear means and drivingly connected to that shaft which is not connected to the planet carrier, selecting means for optionally clutching the sun gear to the casing to hold the sun gear stationary to provide said epicyclic ratio in which relative rotation between the shaft passing through the sun gear and the sun gear takes place or clutching the sun gear to rotate at the same speed as the planet carrier and annulus gear to provide said direct drive ratio in which relative rotation between the sun gear and the casing takes place, a lubricant reservoir in the casing, a chamber which surrounds the shaft passing through the sun gear and is in communication with the reservoir, means for feeding lubricant from said reservoir to said chamber, first lubricant feed means in communication with the chamber and associated with the thrust bearing means and operative on relative rotation of the sun gear and the casing to feed lubricant from said chamber into and through the thrust bearing means, and second lubricant feed means within said bore of the sun gear and in communication with the chamber and operative on relative rotation between the sun gear and the shaft passing through the sun gear to feed lubricant to said planet gear bearing means.

2. A gearing as claimed in claim 1 wherein the second lubricant feed means comprises a bush which is disposed in the bore in the sun gear and around the shaft passing through the latter, said bush being formed with an internal spiral channel for conveying lubricant from said chamber to said planet gear bearing means on relative rotation between the sun gear and the said shaft.

3. A gearing as claimed in claim 1, wherein the thrust bearing means comprises a thrust washer which is formed with a series of outwardly directed slots for conveying lubricant from said chamber through the thrust washer on relative rotation between the sun gear and the casing.

* * * * *